United States Patent [19]
Hijikigawa

[11] Patent Number: 4,594,619
[45] Date of Patent: Jun. 10, 1986

[54] MAGNETIC REPRODUCE APPARATUS WITH MAGNETORESISTIVE HEAD

[75] Inventor: Masaya Hijikigawa, Yamatokoriyama, Japan

[73] Assignee: Sharp Kabushiki Kaisha, Osaka, Japan

[21] Appl. No.: 497,209

[22] Filed: May 23, 1983

Related U.S. Application Data

[60] Division of Ser. No. 358,633, Mar. 16, 1982, Pat. No. 4,405,958, which is a continuation of Ser. No. 116,890, Jan. 30, 1980, abandoned.

[30] Foreign Application Priority Data

Jul. 19, 1979 [JP] Japan .................. 54-100482[U]

[51] Int. Cl.⁴ .................................. G11B 5/12
[52] U.S. Cl. ..................... 360/74.4; 360/113; 360/130.22
[58] Field of Search ................. 360/84–85, 360/95, 72.1, 72.2, 74.4, 113

[56] References Cited

U.S. PATENT DOCUMENTS 2,773,120  12/1956  Masterson .................. 360/8 X
3,376,564   4/1968  Holland ..................... 360/72.2
4,365,277  12/1982  Namiki ..................... 360/72.1

FOREIGN PATENT DOCUMENTS 2350609  10/1975  Fed. Rep. of Germany .... 360/72.2

Primary Examiner—John H. Wolff
Attorney, Agent, or Firm—Birch, Stewart, Kolasch & Birch

[57] ABSTRACT

A magnetic-record reproduction system is provided for selectively reproducing magnetic information signals recorded on a magnetic tape as a plurality of programs, each program being separated from other programs by cue signals. The system includes a head for reproducing the recorded magnetic information, a movable tension arm for maintaining the head in tensioned contact with the magnetic tape, and a cue signal detector mounted to the tension arm to enable selection of recorded programs thereby. A cavity is formed in the tension arm for receiving a magnetoresistive element to form the detector, and a non-magnetic metallic film is mounted on the surface of the tension arm to protect the arm from abrasion as it contacts the magnetic tape.

2 Claims, 10 Drawing Figures

Fig. 1
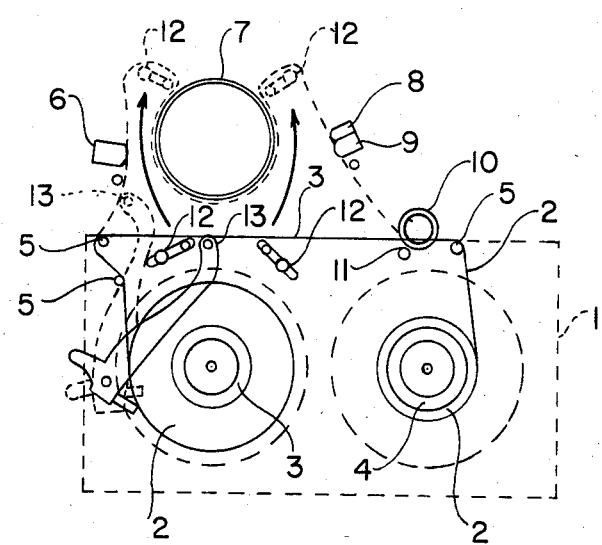
Fig. 2
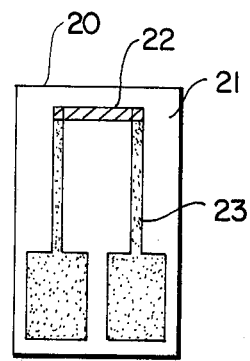

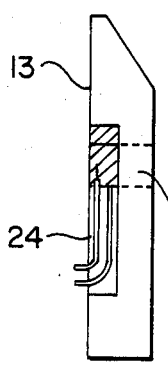
Fig. 3(B)
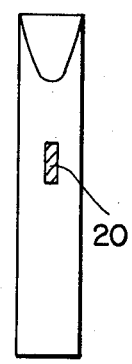
Fig. 3(C)
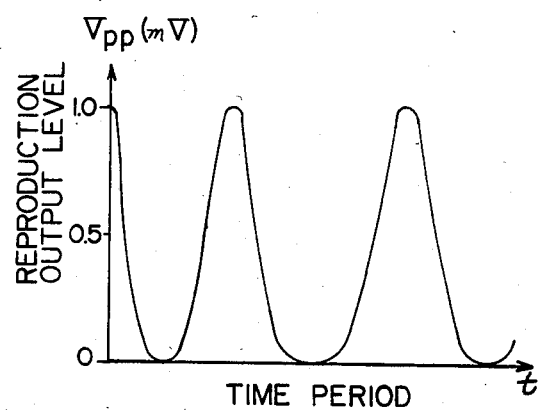
Fig. 4

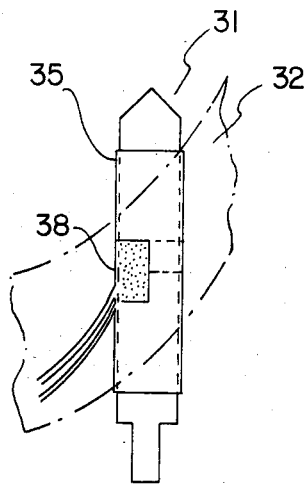 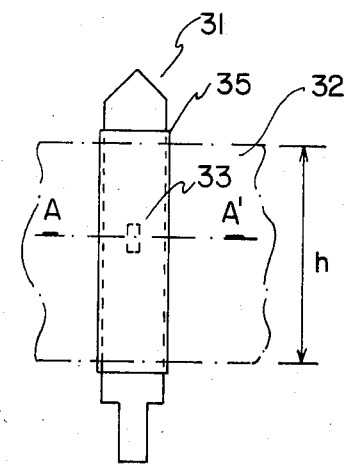
Fig. 5(A)  Fig. 5(B)
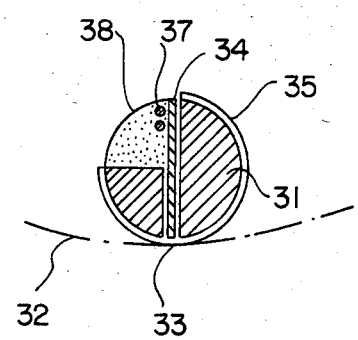 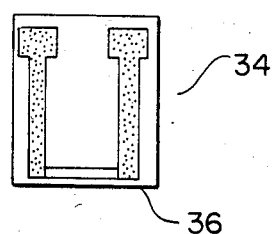
Fig. 6  Fig. 7

MAGNETIC REPRODUCE APPARATUS WITH MAGNETORESISTIVE HEAD

This application is a divisional of copending application Ser. No. 358,633, filed on Mar. 16, 1982, and now U.S. Pat. No. 4,405,958 issued Sept. 20, 1983, which is a continuation of application Ser. No. 116,890, filed Jan. 30, 1980, and now abandoned.

BACKGROUND OF THE INVENTION

The present invention relates to a magnetic reproduce apparatus and, more particular, to an improved magnetic reproduction assembly useful for a magnetic reproduce apparatus with a magnetoresistive head.

The operating principle of magnetoresistive heads was disclosed in, for example, R. P. Hunt U.S. Pat. No. 3,493,694 issued Feb. 3, 1970, entitlee "MAGNETORESISTIVE HEAD".

Since the magnetoresistive heads can provide output signals as high as about ten times those from the well-known electromagnetic effect type head, it is advisable that such magnetoresistive heads be applied to magnetic reproduce apparatuses to improve operation of the apparatuses.

OBJECTS AND SUMMARY OF THE INVENTION

Accordingly, it is the primary object of the present invention to provide an improved magnetic reproduce apparatus including a magnetoresistive head.

It is a further object of the present invention to provide an improved magnetic reproduction assembly useful for a magnetic reproduce apparatus with a magnetoresistive head disposed in contact with the back surface of a magnetic storage medium.

It is a further object of the present invention to provide an improved magnetic reproduce apparatus for providing necessary output signals for reproduction purposes, independently of travel speed of a magnetic storage medium such as magnetic tape.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a magnetic record-reproduction device is provided for controlling a program selection system of a tape containing a recording member and a base element. The recording member records cue signals indicating positions of the tape to reproduce. The base element supports the recording member. A magnetoresistive head comes into contact with the base element for detecting and reproducing the cue signals recorded in the recording member.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is a schematic representation of configuration of a magnetic reproduce apparatus according to the present invention;

FIG. 2 is a configuration of a magnetoresistive head incorporated within the magnetic reproduce apparatus shown in FIG. 1;

FIGS. 3(A), 3(B), and 3(C) are a plan view, a side view, and a front view of a tension arm incorporated within the magnetic reproduce apparatus indicated in FIG. 1, respectively;

FIG. 4 is a graph representing reproduction output levels of the magnetic reproduce apparatus shown in FIG. 1 v. time in connection with cue signals;

FIGS. 5(A) and 5(B) are a side view and a front view of another example of the tension arm related to FIGS. 3(A) through 3(C);

FIG. 6 is a section taken in the plane indicated by line A-A' in FIG. 5(B); and

FIG. 7 is a configuration of another example of the magnetoresistive head incorporated within the tension arm shown in FIGS. 5(A) and 5(B), the magnetoresistive head being related to that shown in FIG. 2.

DESCRIPTOIN OF THE INVENTION

Figure 3A:

FIG. 1 shows a cassette type video tape recorder (VTR) of the type which causes well-known helical scan. The VTR mainly comprises a cassette 1, a magnetic tape 2, a full-width erase head 6, a rotary head drum 7, an audio erase head 8, an audio control head 9, a loading arm 12, a tension arm 13, a magnetoresistive head 20 a substrate 21, a film element 22, a pair of conducting strips 23, and leads 24.

In particular, an appropriate amount of the magnetic tape 2 is wound around a supply reel 3 which is associated with a wind-up reel 4. Either the supply reel 3 or the wind-up reel 4 is selectively engaged with a driver source. Along the travel course of the magnetic tape 2, there are provided a guide pin 5, the full-width erase head 6, the rotary head drum 7, the audio erase head 8, the audio control head 9, a pinch roller 10, and a capstan roller 11.

Around the circumference of the rotary head drum 7, there are positioned two or four video heads. While they rotate at about 200 to 300 rps in the direction opposed to that of the travel of the magnetic tape 2, namely, in the direction in which the relative velocity between the magnetic tape 2 and the video heads increases, they contact or move away from the magnetic tape 2. During one rotation of the video heads, they scan the magnetic tape 2 by a field. The well-known helical scan mode is carried out wherein the magnetic tape 2 is in contact with a part of the circumference of the rotary head drum 7 with a certain angle with respect thereto.

The solid line in FIG. 1 indicates the path of the magnetic tape 2 separated from the rotary head drum 7 during forward operation and rewind operation. In such a case, the magnetic tape 2 extends between the pair of guide pins 5 each of which is disposed adjacent to the supply reel 3 and to the wind-up reel 4. It is unnecessary that the magnetic tape 2 be in contact with the rotary head drum 7.

The dotted line in FIG. 1 shows the path of the magnetic tape 2 in contact with the rotary head drum 7 to cause reproduction of pictures. In such a case, the magnetic tape 2 is regulated by the full-width erase head 6, the rotary head drum 7, the audio erase head 8, and the audio control head 9. A pair of loading arms 12 is provided as a tape guide for changing the pathway for the magnetic tape 2 to the position where it comes into contact with the rotary head drum 7. The position of the pair of loading arms 12 is changed from the first position where the magnetic tape 2 is spaced from the rotary head drum 7 to the second position where the former is in contact with the latter as indicated by each of lines with an arrow head in FIG. 1.

The tension arm 13 positioned near the supply reel 3 is pivoted so that the tension arm 13 becomes contact with the back surface of the magnetic tape 2 which is in contact with the rotary head drum 7. The tension arm 13 stresses the magnetic tape 2 appropriately toward the durm 7. The windup reel 4 is engaged with the drive source for drive purposes, so that the magnetic tape 2 is subsequently traveled from the supply reel 3 to the wind-up reel 4. The rotary head drum 7 is operated to cause the reproduction of pictures recorded in the magnetic tape 2.

In addition to the reproduction of the pictures, the rotary head drum 7 functions to record video signals by the video heads provided therein. The full-width erase head 6 functions to completely erase the total signals recorded on the magnetic tape 2 and to record cue signals in video tracks of magnetic storage medium of the magnetic tape 2. The audio erase head 8 acts to erase only sound signals recorded in audio tracks of the magnetic tape 2.

The audio tracks are formed at the edge of the magnetic tape 2 along the travel direction of the magnetic tape 2. The audio control head 9 is provided for recording sound signals in audio tracks and recording control signals in control tracks of the magnetic tape 2. The control signals are recorded to obtain synchronization between video signals recorded in video tracks of the magnetic tape 2 and the sound signals recorded in the audio tracks of the same. The pinch roller 10 and the capstan roller 11 embrace in combination the magnetic tape 2 so that the magnetic tape 2 rotates round the rotary head drum 7 in a certain constant speed. Jitter of the pictures reproduced on a screen greatly depends upon the stability of travel speed of the magnetic tape 2. To secure stable travel speed of the magnetic tape 2, the pinch roller 10 and the capstan roller 11 are provided for embracing the magnetic tape 2 in pressure and, in addition, the tension arm 13 is employed to stress the magnetic tape 2 constantly toward the rotary head drum 7.

At the top of the tension arm 13, there is coupled a magnetoresistive head comprising a film element, preferably, formed of a thin, narrow strip of ferromagnetic metallic material of low anisotropy, such as Permalloy. The magnetoresistive head is provided for detecting cue signals record in the magnetic tape 2. The cue signals are recorded to indicate positions of programs recorded in the magnetic tape 2, while the magnetic tape 2 is traveled. The record of the cue signals permits the well-known program selection system. The cue signals are detected during the rewind operations and the forward operations of the magnetic tape 2. As the magnetoresistive head is disposed on the top of the tension arm 13, the magnetoresistive head comes in contact with the back surface of the magnetic tape 2. The back surface of the magnetic tape 2 is opposite to the front surface of it which is in contact with the rotary head drum 7.

According to the provision of the magnetoresistive head disposed on the top of the tension arm 13, the change of travel of the magnetic tape 2 is not prevented by the magnetoresistive head. This means that the space for required magnetic heads can be as compact as possible. On the front surface of the magnetic tape 2, there is formed a layer of a magnetic material as a magnetic storage medium.

Therefore, on the back surface of the magnetic tape 2, there is formed a base layer for supporting the magnetic layer.

When it is directed during the rewind operations or the forward operations of the magnetic tape 2 that the cue signals should be detected, the top of the tension arm 13 is controlled by a drive means so that it comes in contact with the back surface of the magnetic tape 2 extended between the pair of the guide pins 5 each of which is adjacent to the supply reel 3 and to the wind-up reel 4. The magnetoresistive head is supplied with an appropriate amount of current for driving purposes in order to detect and reproduce the cue signals. The top of the tension arm 13 may be disposed to be continuously in contact with the back surface of the magnetic tape 2 during its rewind operations or its forward operations. The cue signals are erased by the full-width erase head 6.

The principle of the present invention will be now explained as follows: If the reproduction of data record on the magnetic tape 2 were obtained using the back surface of it comprising no magnetic storage medium, spacing loss would be inevitably increased at least by the thickness of the base layer for supporting the magnetic storage medium disposed as the front surface of the magnetic tape 2. This means that reproduction output signals are decreased; The spacing loss is well-known as $-54.6\, d/\lambda$ (dB) (d: the spacing, $\lambda$: recorded frequency). This equation indicates that the spacing loss is minimized as the record frequency becomes longer; It may be possible that an adequately long recorded frequency be reproduced from the back surface of the magnetic tape 2; The minimum record frequency which can be obtained from the back surface of the magnetic tape 2 depends on a strength of a magnetic field for record, the thickness of the magnetic storage medium, the thickness of the base layer, the gap between the magnetic heads, the reproduction efficiency, and the like.

In addition, in the conventional head utilizing an electromagnetic effect, the minimum recorded frequency which can be reproduced from the back surface was relied upon the relative velocity between the magnetic heads and the magnetic storage medium; Thus it was impossible in practive to obtain the record signals from the back surface because it was required in the conventional head that the minimum recorded frequency became a great amount wherein the magnetic tape 2 and the magnetic heads were driven by a large amount of speed, the contents of information to be recorded was decreased, and the drive system was increased in power; On the contrary, in connection with the magnetoresistive head of the present invention, the minimum recorded frequency available becomes independent on the relative velocity between the magnetic heads and the magnetic storage medium; The magnetoresistive head is superior about ten times to the conventional head in obtaining recorded signals; And the magnetoresistive head can be formed according to steps that a magnetic film, a conductive film, and an insulating film are formed on a substrate by vacuum evaporation methods or plating methods and then are patterned by chemical etching techniques. The magnitude of the magnetoresistive head can be compact considerably as compared with the conventional head.

According to the above-mentioned pinciple, the magnetoresistive head is incorporated within the tension arm 13. FIG. 2 shows an example of a preferred embodiment of the magnetoresistive head 20. FIGS. 3(A), 3(B), and 3(C) are respectively a plan view, a side view, and a front view of the top of the tension arm 13 containing the magnetoresistive held 20 shown in FIG. 2.

With reference to FIG. 2, the magnetoresistive head 20 comprises a substrate 21, a magnetic film 22, and a pair of conductors 23. The substrate 21 is made of glass and the like. The magnetic film 22 is preferably formed of a thin-narrow strip of ferromagnetic metallic material of low anisotropy such as Permalloy, having a width of the order about 1 mm, and a thickness of the order of about 300 angstroms.

The magnetoresistive head 20 detects the magnetic fields associated with the magnetization within the magnetic storage medium. The magnetic film 22 is of low anisotropy electrically-conductive magnetic material secured in magnetically bridging relation adjacent the magnetic storage medium. The magnetic film 22 has a selected magnetization state responsive to the magnetic fields within the magnetic storage medium which rotate the magnetization in the magnetic film 22 and vary accordingly the resistivity thereof. The magnetic film 22 is formed on the substrate 21 according to the vacuum evaporation techniques or the plating methods. The pair of the conductors 23 are also formed on the substrate 21 such that they are connected to each of the ends of the magnetic film 22 for picking up electromotive force caused in the magnetic film 22.

In FIGS. 3(A) to 3(C), the top of the tension arm 13 is composed of a nonmagnetic material in a rod shape having diameter of about 5 mm. The magnetoresistive head 20 is buried with the tension arm 13 such that the magnetoresistive head 20 is secured in separation from a contact surface to the magnetic tape 2 in the order of about 80 $\mu$m. A pair of parallel dotted lines shown in FIG. 3(A) indicate the provision of the magnetoresistive head 20. As viewed from FIG. 3(B), there are provided a pair of lead lines 24 connected to each of the pair of the conductors 23. A dotted line prependicular to the pair of the parallel dotted lines shown in FIG. 3(A) shows the arrangement of the pair of the lead line 24. The pair of the lead like 24 is coupled to a detection circuit at the exterior of the tension arm 13. A latticed symbol shwon in FIG. 3(B) indicates a buried portion of the magnetoresistive head 20 within the tension arm 13.

FIG. 4 shows a graph showing reproduction characteristics of the cue signals obtained by the magnetoresistive head shown in FIG. 2. The cue signals are recorded within the video tracks by the full-width erase head 6. The cue signals are characterized in that the recorded frequency is about 1 mm and the width of recorded tracks is about 10 mm. The cue signals are reproduced by the magnetoresistive head during the rewind operations or the forward operations of the magnetic tape 2. The width of the magnetic film 22 of the magnetoresistive head 20 available in detecting the cue signals is in the order of about 1 mm.

The data in FIG. 4 are plotted with reproduction output levels Vpp (mv) as ordinate the time priod as abscissa. Provided that the base layer df the magnetic tape 2 is about 16 $\mu$m in thickness, the spacing between the magnetoresistive head 22 and the magnetic storage medium of the magnetic tape 2 is about 0.1 mm. The data of FIG. 4 are obtained under the condition where an appropriate amount of detection current in the order of about 5 mA is applied to the magnetoresistive head and, in addition, any bias current is not applied thereto.

As viewed from FIG. 4, the reproduction output levels Vpp are obtained in the order of about 1 mV. The S/N ratio is well enough.

In another example of a preferred form of the present invention, the magnetoresistive head 20 may be formed on any of the guide pin 5 or any other element adajcent the magnetic tape 2 except the tension arm 13.

The range of the recorded frequency of the cue signals which can be detected by the magnetoresistive head according to the principle of the present invention is in the order of about 200 or 300 $\mu$m to about 2.0 mm under the condition that the width of the magnetic film 22 of the magnetoresistive head 20 available in detecting the cue signals is in the order of about 100 $\mu$m and that the spacing between the magnetic storage medium of the magnetic tape 2 and the magnetic film 22 of magnetoresistive head 20 is in the order of about 100 $\mu$m. If the spacing is smaller, the recorded frequency of the cue signals to be detected by the magnetoresistive head is decreased to several microns.

In the above-mentioned preferred embodiment of the present invention, the cue signals are recorded in the video tracks in the magnetic storage medium of the magnetic tape 2 by the full-width erase head 6 as disclosed in Japanese published unexamined patent application No. 81211/1978 laid open on July 18, 1978. Instead, the cue signals can be recorded in the control tracks in the magnetic storage medium of the magnetic tape 2 by the audio control head 9 as disclosed in Japanese published examined patent application No. 14205/1978 published on May 16, 1978. In short, as far as the cue signals are recorded in any of tracks in the magnetic tape 2 having a width of the order of about 10 $\mu$m, the cue signals can be reproduced by the magnetoresistive head of the present invention regardless of the position of the tracks within the magnetic tape 2. The magnetoresistive head can be adopted in its stripe length and its stalled position to permit the cue signals to be detected.

FIGS. 5(A) and 5(B) show respectively a side view and a front view of another preferred form of the tension arm containing the magnetoresistive head according to the present invention related to FIGS. 3(B) and 3(C). In FIGS. 5(A) and 5(B), there are provided a tension arm 31, a magnetic tape 32, an opening 33, an non-magnetic metallic film 35, a pair of leads 37, and a resin material 38.

The diameter of the tension arm 31 is in the order of about 5 to 7 mm. The magnetic tape 32 is traveled in a location indicated by a numeral h in FIG. 5(B). The opening 33 is formed to bury the magnetoresistive head. The magnetoresistive head is positioned to confront the tracks in the magnetic tape 32 in which the cue signals are recorded. The tension arm 31 is composed of Zn, Al, or any metallic material which is made as die casting. To secure abrasion-resistance of the tension arm 31 against the magnetic tape 32, the non-magnetic metallic film 35 is wound around a surface of the tension arm 31. The magnetic tape 32 is in contact with the tension arm 31 on this surface. The non-magnetic metallic film 35 is made of SUS 303, SUS 304, SUS 316, or any other stainless steel material. The non-magnetic metallic film 35 is fixed to the body of the tension arm 31 by means of spot welding. Instead of metallic material of Zn and the like of the tension arm 31, any synthetic resin such as a ABS resion may be adopted for the tension arm 31.

The pair of the leads 37 shown in FIG. 5(A) is related to the pair of the lead lines 24 indicated in FIG. 3(B). The resin material 38 is provided for supporting the pair of the leads 37.

FIG. 6 is a section taken in the plane indicated by line A-A' indicated in FIG. 5(B). An element of a magnetoresistive head 34 is enburied within the opening 33 of the tension arm 31.

FIG. 7 shows the magnetoresistive head 34 in detail related to FIG. 2. The magnetoresistive head 34 comprises a magnetic film 36 shown in FIG. 7 associated with the magnetic film 22 indicated in FIG. 2.

The magnetoresistive head 34 is in contact with the base layer of the magnetic tape 32, the base layer comprising no magnetic storage medium. The spacing between the magnetic film 36 and the magnetic storage medium of the magnetic tape 32 formed on the base layer is calculated as at least the sum of the thickness of the base layer of the magnetic tape 32 and the thickness of the non-magnetic metallic film 35. Preferably, the thickness of the base layer is in the order of about 20 $\mu$m and that of the non-magnetic metallic film 35 is in the order of about 50 $\mu$m. The spacing is obtained as about 70 $\mu$m.

Conventionally, the base layer of the magnetic tape 2 or 32 is composed of a thin film made of polyethylene terephthalate (PET) and the like. The base layer of such the thin film provides less abrasion to the magnetic film of the magnetoresistive head than the magnetic storage medium of the magnetic tape. Since the magnetoresistive head does not come in contact with the magnetic storage medium, the magnetic storage medium is protected from being damaged by the magnetoresistive head. If the magnetic storage medium is damaged, reproduction output signals are dropped out.

As described above, inaccordance with the present invention, the cue signals recorded in the magnetic tape can be detected and reproduced with efficiency. The cue signals are characterized by having relative long recorded frequencies. The following features are obtained according to the present invention:

(1) The cue signals are detected regardless of the travel speed of the magnetic tape.

(2) The operations of a total device for driving the magnetic tape are not prevented by a system for detecting and reproducing the cue signals.

(3) Any additional independent operating mechanism is not required to be added to the total device for driving the magnetic tape.

(4) The magnetic storage medium formed in the magnetic tape is not damaged by the system for sensing the cue signals recorded in the magnetic storage medium.

(5) The magnetic film of the magnetoresistive head is protected from obrasion by means of the magnetic tape.

(6) The magnetic film can be readily constructed as a multichannel head element where it senses the cue signals recorded in two or more tracks of the magnetic storage medium of the magnetic tape.

As far as the base layer of an extensible magnetic tape is not too thick wherein the cue signals can be sensed, such the extensible magnetic tape can be adopted as a storage medium for the present invention in place of the above-stated magnetic tape.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A magnetic-record reproduction system for selectively reproducing magnetic information signals recorded on a magnetic tape as a plurality of programs, each said program being separated from others on said tape by cue signals, comprising:

head means for reproducing said magnetic information signals recorded on said tape;

transport means for moving said tape across said head means, said transport means including, tensioning means for maintaining said tape in tension as it is moved across said head means, said tensioning means including a movable tension arm contacting said tape; and detector means mounted to said tension arm for sensing said cue signals to enable selection of said program thereby, said detector means including a magnetoresistive element;

said tension arm including, a cavity formed in said tension arm and receiving said magnetoresistive element, and a non-magnetic metallic film mounted on the surface of said tension arm and providing abrasion-resistance to said tension arm as it contacts said magnetic tape.

2. The magnetic-record reproduction system of claim 1 wherein said programs are recorded on a front side of said tape;

said cue signals monitored by said detector means being located on a back side of said tape.

* * * * *